(12) United States Patent
Okuyama

(10) Patent No.: US 7,209,558 B2
(45) Date of Patent: Apr. 24, 2007

(54) REPRODUCING DEVICE, REPRODUCING METHOD, AND RECEIVING DEVICE

(75) Inventor: Takehiko Okuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 799 days.

(21) Appl. No.: 10/102,966

(22) Filed: Mar. 22, 2002

(65) Prior Publication Data

US 2002/0141580 A1    Oct. 3, 2002

(30) Foreign Application Priority Data

Mar. 29, 2001   (JP)   ............................. 2001-095046

(51) Int. Cl.
*H04N 7/167*   (2006.01)
(52) U.S. Cl. ........................................ 380/201; 726/31
(58) Field of Classification Search ................ 380/201, 380/255, 277, 200; 713/200, 201, 1, 2, 188, 713/194; 726/2, 31
See application file for complete search history.

(56) References Cited

U.S. PATENT DOCUMENTS

| | | | |
|---|---|---|---|
| 5,592,675 A | * | 1/1997 | Itoh et al. .................... 713/300 |
| 5,699,426 A | * | 12/1997 | Tsukamoto et al. ......... 380/240 |
| 5,933,570 A | | 8/1999 | Fujita |

FOREIGN PATENT DOCUMENTS

| | | |
|---|---|---|
| EP | 0 998 140 A1 | 3/1998 |
| JP | 8-7534 | 1/1996 |

OTHER PUBLICATIONS

European Search Report dated Apr. 6, 2006 for Appln. No. 02006894.6-2202.
Japanese Patent Office Action dated Feb. 20, 2004.
Digital Transmission Content Protection, vol. 1, Appendix B, Part 2, "Compliance Rules for Source Functions", pp. B11-C13 and pp. 65-71.

* cited by examiner

*Primary Examiner*—Kim Vu
*Assistant Examiner*—Joseph Pan
(74) *Attorney, Agent, or Firm*—Pillsbury Winthrop Shaw Pittman, LLP

(57) ABSTRACT

A transmitting section divides a content recorded in a recording medium into data of a predetermined size, reproduces the data, and transmits the data to a receiving device. An erasing section erases the outputted data recorded in the recording medium, when the data of the predetermined size is transmitted to the receiving device. An EOB adding section adds an EOB, which shows an end of transmission, to the data transmitted from the transmitting section, when a power off signal is inputted during transmission of data by the transmitting section. An EOB-added data position storing section stores a recording position, on the recording medium, of the data to which the EOB is added. Then, a power off control section turns off a power of the device.

19 Claims, 7 Drawing Sheets

REPRODUCING DEVICE, REPRODUCING METHOD, AND RECEIVING DEVICE

CROSS-REFERENCE TO RELATED APPLICATIONS

This application is based upon and claims the benefit of priority from the prior Japanese Patent Application No. 2001-095046, filed Mar. 29, 2001, the entire content of which are incorporated herein by reference.

BACKGROUND OF THE INVENTION

1. Field of the Invention

The present invention relates to a device which handles AV (audio/video) contents, and in particular, to a reproducing device, a reproducing method, and a receiving device, which are provided with content protection technology such as an HDD recorder, an STB (set top box) having a built-in HDD, a personal computer, or the like.

2. Description of the Related Art

In recent years, devices, which record in a built-in hard disk drive (hereinafter, referred to as HDD), contents (programs consisting of images/sound, programs by digital broadcasting, data by data broadcasting, and the like) sent by broadcasting, and which enable a program which has already been recorded in the HDD to be watched and listened to while recording a program which is currently being broadcast, and DVD recording/reproducing devices or VTRs which have a built-in HDD, have started to be sold by respective companies.

Various demands have been made on such devices by copyright holders, and currently, discussions are being carried out between the parties which transmit contents and the copyright holders. Specifically, content data which is broadcast by digital broadcasting does not deteriorate even if copied. Thus, the standardization of processing by which data is recorded in an HDD which is built in a device, and after ninety minutes, for example, have passed, the recorded data is automatically erased, and the standardization of MOVE processing in which immediately after data is reproduction-outputted from the built-in HDD, the data (the original data) which is still recorded in the HDD and which corresponds to the reproduction-outputted data is erased, and the like, have advanced.

A case where MOVE processing of a content from an HDD to a DVD-RAM is carried out, in a conventional DVD recording/reproducing device in which an HDD is built (hereinafter called HDD built-in DVD device), will be described hereinafter.

First, a signal including content transmitted from a broadcasting station is processed by a tuner and/or a decoder, and thereafter, is inputted to the HDD built-in DVD device, and is entirely stored once in the HDD which is built in the device.

When a user wishes to record onto a DVD-RAM the aforementioned content recorded once in the HDD, a control device in the HDD built-in DVD device instructs the HDD to reproduce the content, and instructs a DVD drive to record the content which is reproduced. Then, in the HDD built-in DVD device, the designated content is recorded onto a DVD-RAM disk via an IDE interface or the like from the HDD.

At this time, when the content is a content having a restriction on copying, i.e., is a content such that the original data in the HDD must be erased if the data is reproduced one time, immediately after the data is reproduction-outputted for recording onto the DVD-RAM disk, the data which is still recorded in the HDD and which corresponds to the reproduction-outputted data is erased from the HDD. In this way, a processing which erases the recorded content of the source of reproduction at substantially the same time as reproduction-outputting is called MOVE processing. Note that, when data is recorded onto a DVD-RAM, the content is set as copy prohibited data ("No more copy" data), and further copying thereof is prohibited.

Next, operation in a case where a set top box which has an HDD built-in (hereinafter referred to as an HDD built-in STB) carries out MOVE processing of a content from the HDD to a digital TV (display) connected to the STB will be described.

First, a signal including content transmitted from a broadcasting station is received and processed by a digital broadcast receiving section of the HDD built-in STB, and thereafter, is entirely stored once in the HDD built in the device. The content inputted to the HDD built-in STB may be, other than a signal received by the digital broadcast receiving section, a signal reproduced by another reproducing device such as a DVHS or the like.

When the user wishes to, by using a digital TV, reproduce, watch and listen to the content which has been entirely recorded once in the HDD, the user instructs the HDD built-in STB to reproduce the content. The control device in the HDD built-in STB instructs the HDD to reproduce the content. Then, the content is reproduced from the HDD, and is outputted to the digital TV via an IDE interface or an IEEE 1394 interface. The content is thereby reproduced, watched and listened to on the digital TV.

At this time, when the content must be erased if reproduced one time, the content which has been recorded in the HDD, whose data has been reproduction-outputted, is erased from the HDD at the time of being reproduction-outputted from the HDD onto the digital TV for watching and listening.

In this case, when the content is reproduced while being recorded, if the user sets the reproduction state into a pause state and leaves his/her seat and then returns thereafter for example, the user can continuously watch and listen to the program from the scene at the time when the user left his/her seat.

In this way, when the content received is not reproduction-outputted for long-term storage and is reproduction-outputted for viewing and listening to on a digital TV or the like, the reproduction-outputted data is erased from the HDD. This processing is included in MOVE processing.

When data recorded in the HDD is erased at the time of MOVE operation, the reproduction-outputted data may be actually erased by an erase head. Or, the address values of the respective data recorded in a management table in the HDD which manages the positions of recorded data may be erased such that the data cannot in any way be correctly reproduced from the HDD.

Further, when data recorded in the HDD is erased at the time of MOVE operation, the respective data which form the content are erased immediately after reproduction-outputting (copying), or are erased after a certain time has passed after reproduction-outputting. When the content recorded in the HDD is erased after reproduction-outputting an entire content, a state arises in which the same contents exist on recording media such as the HDD, the DVD-RAM and the like. This is therefore unfavorable from the standpoint of copyrights.

In such MOVE processing, no consideration whatsoever has been given in the prior art to a power being turned off in the midst of MOVE such that the processing is interrupted.

In this way, in conventional reproducing devices, reproducing methods and receiving devices, MOVE does not erase the original content after the content has been entirely reproduced (or copied). For example, each time a data packet is reproduced, MOVE erases the corresponding data packet in the HDD.

There may be cases where, in the midst of MOVE operation, MOVE operation is interrupted due to the power switch of the device being turned off, or due to power off being instructed by the user misoperating the remote controller, or due to a power off command being inputted from another device via a network such as IEEE1394. In such a case, because a part of the original stream has already been erased, there is the problem that the content which has been subjected to MOVE processing cannot be restored at either of the transmitting side or the receiving side, and a part or all of the content cannot be reproduced.

There is an OS which utilizes, as a technique of moving files in a personal computer, a method in which, in order to protect a file, the entire file is copied once, and the copy is verified with the original file, and after confirming the correspondence, the original file is erased. In the case of such an OS, because the backing-up itself can be thought of as a complete copy, in the case of AV content which is copyrighted, this is not permissible from the standpoint of the intent of the copyright holders.

As described above, if a power off request arises at a device at which MOVE operation is being carried out, and the power of the device is turned off and operation is interrupted, there is a problem in that the original stream cannot be restored and a part of or all of the content cannot be reproduced.

BRIEF SUMMARY OF THE INVENTION

An object of the present invention is to provide a reproducing device, a reproducing method, and a receiving device which prevent breakage of a content when a power of the device is turned off during MOVE operation.

In order to achieve the above object, according to one aspect the present invention, there is provided a reproducing device comprising: a transmitting section which divides one file recorded in a recording medium into data of a predetermined size which is smaller than the one file and transmits the data to a receiving device; an erasing section which erases the transmitted data recorded in the recording medium, when the transmitting section transmits the data of the predetermined size to the receiving device; and an ending flag adding section which adds an ending flag to the data transmitted from the transmitting section, when a power off signal for turning off a power is detected.

In accordance with the embodiments of the present invention, in the midst of MOVE operation, even if a power is turned off by a power off request or power is suddenly not supplied due to a power failure or the like, the continuity of the content data recorded in the receiving side device can be maintained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

FIG. 5 is a flowchart showing restart operation of the transmitting side device in a case where the power of the transmitting side device is turned off, and thereafter, is turned on.

DETAILED DESCRIPTION OF THE INVENTION (First Embodiment)

Hereinafter, a first embodiment of a reproducing device and a receiving device of the present invention will be described in detail with reference to FIG. 1 and FIG. 2.

Figure 1:
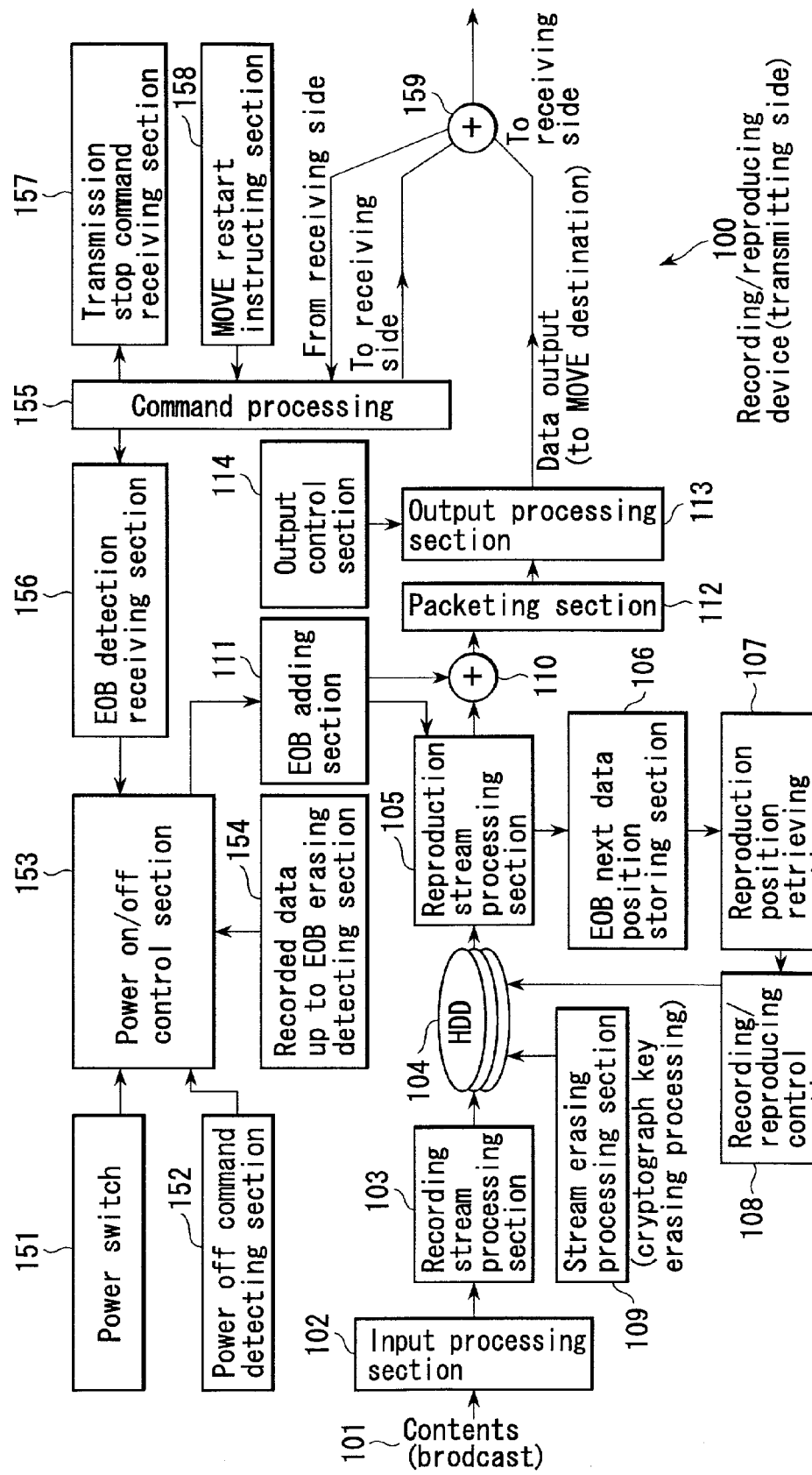
FIG. 1 is a block diagram showing a constitution of an embodiment of a transmitting side reproducing device in accordance with the present invention.
Figure 2:
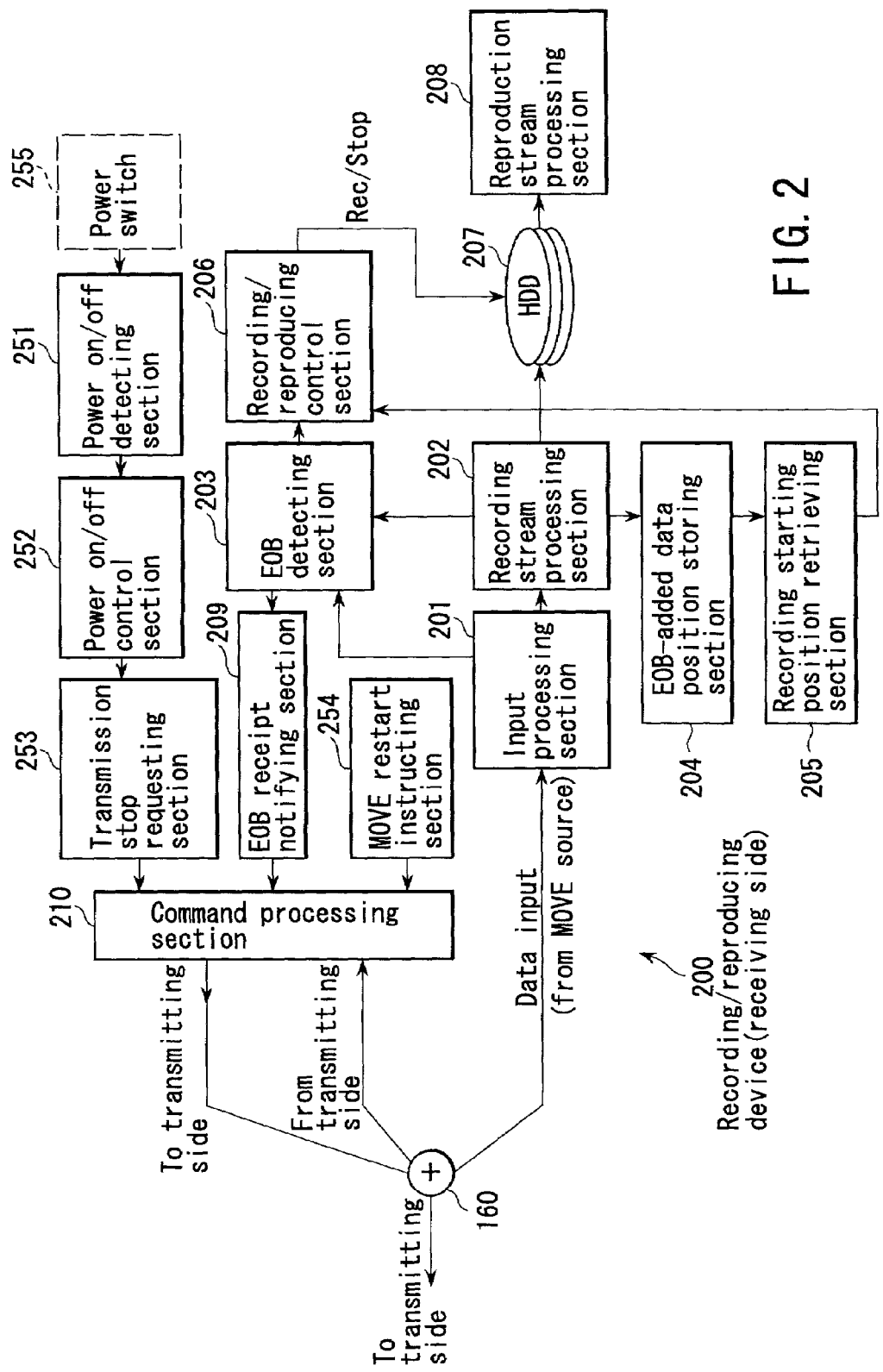
FIG. 2 is a block diagram for explaining a constitution of an embodiment of a receiving device in accordance with the present invention.

FIG. 1 and FIG. 2 are block diagrams showing a constitution of a transmitting side recording/reproducing device and a constitution of a receiving side recording/reproducing device, respectively. When a content having a copy restriction is transmitted by MOVE processing from the transmitting side device to the receiving side device, the device of FIG. 1 operates as a reproducing device, and the device of FIG. 2 operates as a receiving device. The devices of FIG. 1 and FIG. 2 may be provided in the same device, or may be provided separately (with respective power sources).

A transmitting device 100 of FIG. 1 records and reproduces contents which are received, and transmits contents to a receiving side device 200 of FIG. 2. In FIG. 1, a signal transmitted by a broadcast or a video/audio signal from an external device is inputted as contents 101 to an input processing section 102.

The input processing section 102 selects a desired stream as a content to be recorded in an HDD 104 from the input streams. For example, in a digital broadcast receiving device, the input processing section 102 has a tuner section and a processing section which demultiplexes a transport stream corresponding to a selected channel. The input processing section 102 outputs the processed signal to a recording stream processing section 103.

The recording stream processing section 103 extracts the signal to be recorded in the HDD 104 from the signal inputted from the input processing section 102 and processes the signal, and outputs the signal to the HDD 104.

For example, when the recording/reproducing device 100 is an STB which receives digital broadcasts, the recording stream processing section 103 extracts a packet from transport stream from the input processing section 102, and processes the packet for the HDD 104. A recording/reproducing control section 108 controls operation of the HDD 104 at the time when the extracted packet is recorded into the HDD 104. Further, when the recording/reproducing device 100 is a DVD recording/reproducing device, the recording stream processing device 103 processes data in the form of a program stream, and the processed data is recorded in the HDD 104 under the control of the recording/reproducing control section 108.

Further, when there is the need to carry out encryption at the time of recording into the HDD 104, the recording stream processing section 103 encrypts a stream, and the encrypted signal is recorded in the HDD 104 under the control of the recording/reproducing control section 108. Data (the encryption key) for deciphering (decoding) the cipher at the time of reproduction is recorded into the HDD 104 together with the stream.

In this embodiment, a case will be described in which a content (data file) which must be erased after being reproduced one time are recorded in the HDD 104 in advance.

At the time of reproducing data, the recording/reproducing control section 108 retrieves the content for which reproduction is requested from among the contents recorded in the HDD 104, and outputs a reproduction stream which corresponds to the content to a reproduction stream processing section 105. The reproduction stream processing section 105 carries out reproduction signal processing such as error correction of the reproduction stream inputted from the HDD 104 or the like, and decoding processing by an encryption key which will be described later, and the processed data is outputted to a packeting section 112 via an adding section 110.

The packeting section 112 packets the input data into a format which corresponds to an interface 159. The packeted packet data is outputted via an output processing section 113 to the recording/reproducing device 200 shown in FIG. 2 which is the MOVE destination. When the data is encrypted at the time of recording into the HDD, the reproduction stream processing section 105 deciphers (decodes) the cipher by using the encryption key read out from the HDD 104. An output control section 114 carries out control of starting and stopping of transfer at the time of transferring the data to the MOVE destination.

When the interface 159 is an IEEE1394 interface, the output processing section 113 carries out IEEE1394 interface output processing. When the interface 159 is an IDE interface, the output processing section 113 carries out IDE interface output processing. At this time, the output control section 114 controls the interface processing of the output processing section 113.

In the MOVE operation, the data, which is still recorded in the HDD 104 and which corresponds to data of a predetermined size (for example, 1 packet) outputted from the HDD 104, is erased by a stream erasing processing section 109 immediately or during a predetermined period of time after the data is outputted. This predetermined period of time is, for example, 1 minute. In this case, the erasing processing section 109 may erase the recorded stream itself, or may erase the address of the stream recorded in a management table in the HDD 104 such that the recorded stream cannot be reproduced again, or may erase the encryption key from the HDD 104 in a case where the recorded stream is encrypted.

In this way, the MOVE operation starts. During this MOVE operation, there is possibility that a user may erroneously turn off a power switch 151 at the transmitting side shown in FIG. 1 before entire content desired by the user is outputted to the device at the transmitting side, and there is the possibility that the power of the receiving side device may be turned off in a case where the devices of the transmitting side and the receiving side have separate power sources. Conventionally, if the power switch of the device is turned off, the power is immediately turned off. However, the device of the present invention is not immediately turned off.

Figure 3:
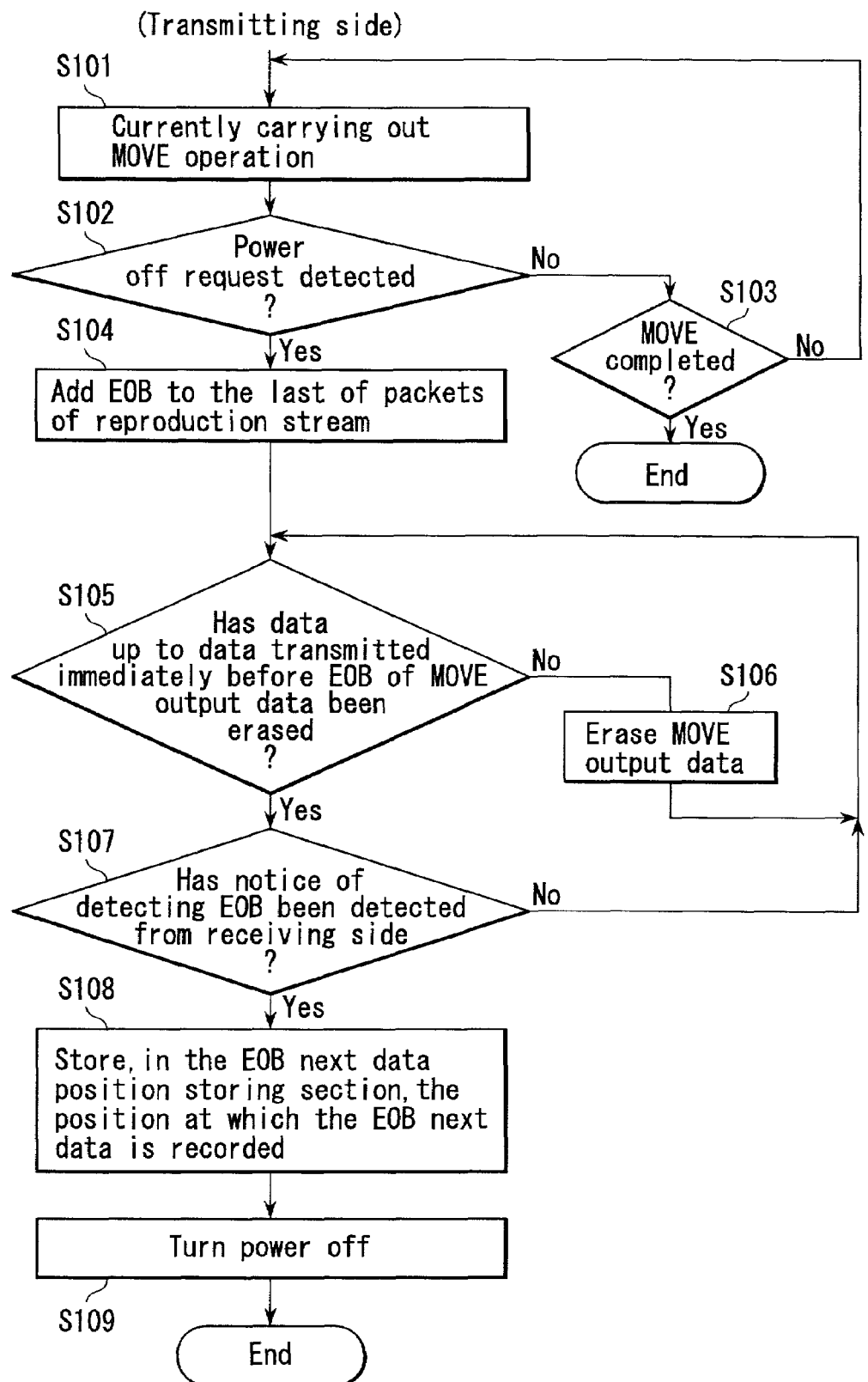
FIG. 3 is a flowchart showing operations of the transmitting side device in a case of turning a power off during MOVE operation.

FIG. 3 is a flowchart showing operations of the transmitting side device 100 in a case of turning a power off during MOVE operation. A power off command detecting section 152 detects, during MOVE operation, whether the power switch 151 is operated to be power off, or whether a power off command is received via the interface 159 from the receiving side device, or, when the device 100 is connected to a communication network (not shown), whether a power off command is received or not via the network (S102). If a power off operation or an off command is detected (in the case of YES in step S102), a power on/off control section 153 adds an EOB (End of bit) as an ending flag by an EOB adding section 111 to the end of the reproduction stream outputted from the reproduction stream processing section 105 (S104). The EOB is transmitted to the receiving device as an ending flag, an interrupt signal, or a break point.

Figure 4:
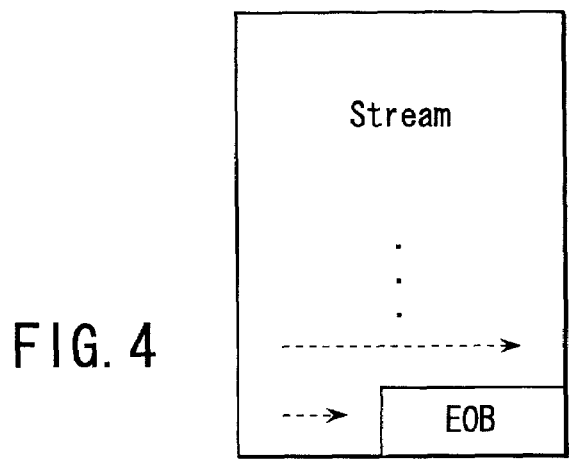
FIG. 4 shows a constitution of transmission data, in which an EOB is added to a reproduction stream and which is made into packets by a packeting section.

FIG. 4 shows a constitution of transmission data in which an EOB is added to a reproduction stream and which is made into packets by the packeting section 112. This reproduction stream includes a plurality of packets, and an EOB packet is added as the last packet. Or, the EOB may be added in the last packet of the reproduction stream.

A recorded data erasing detecting section 154 detects whether the data in the HDD 104, has been erased up to the data transmitted immediately before the EOB (the data to which the EOB is added) or not, by the stream erasing processing section 109 (S105). When it is detected that erasing has been carried out, (in the case of YES in S105), an EOB detection receiving section 156 detects whether or not a notice (command) showing that the EOB is received has been received via a command processing section 155 from an EOB receiving notifying section 209 in the receiving side device which will be described later (S107).

When a notice of receiving an EOB is detected (in the case of YES in step S107), on the basis of the recording position in the HDD 104 of the data to which the EOB is added, an EOB position storing section 106 prepares information for restarting reproduction and stores the information in the HDD 104. For example, the EOB position storing section 106 calculates and records the recording position of the data, in the HDD 104, which is to be transmitted after the stream to which the EOB is added (S108). In other words, the EOB position storing section 106 stores the start position of the stream in the HDD 104 which has not been transmitted yet. Lastly, the power on/off section 153 turns the power of the transmitting side device 100 off (S109).

Note that, when the transmitting side device 100 is connected to a network (not shown) and a power off command is received from the network, the power on/off control section 153 turns off the power of the transmitting side device 100 or the power of the receiving side device 200 or the powers of the both devices, in accordance with the power off command.

Figure 5:
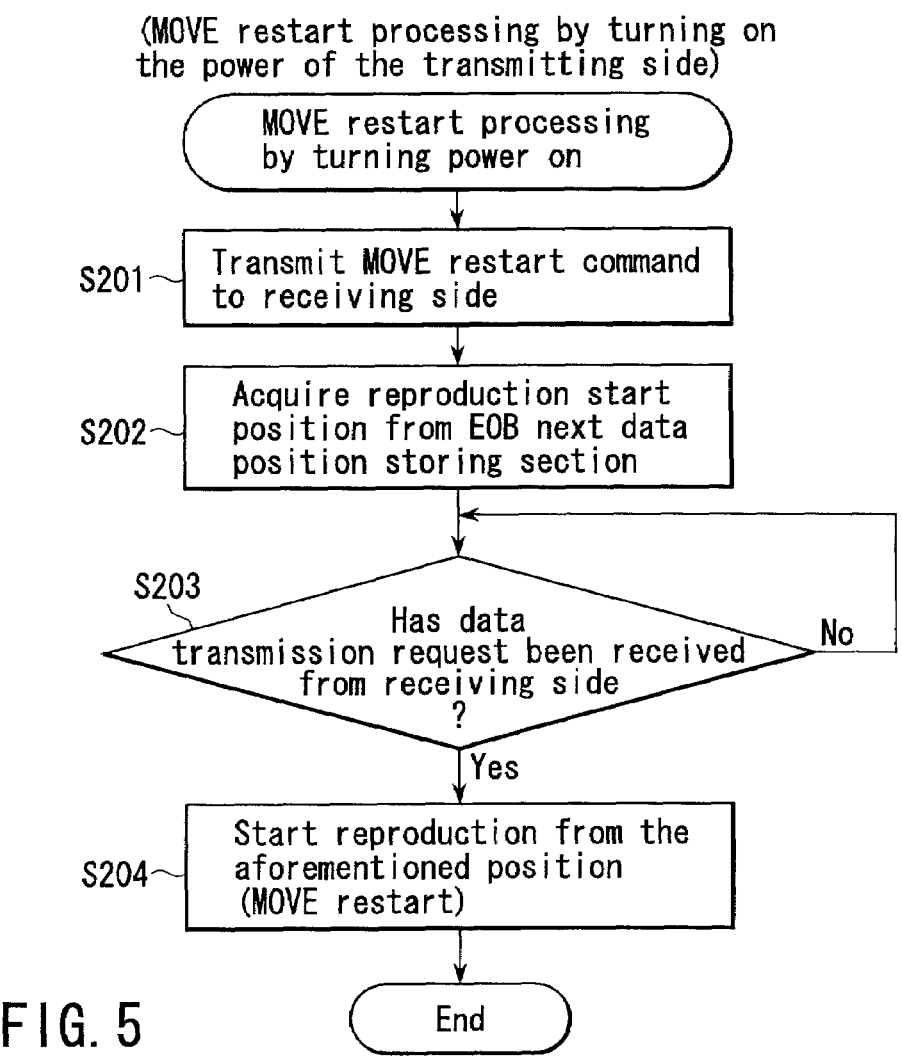

Next, after the power is turned off, if the power of the transmitting side device 100 is turned on by the user, the transmitting side device restarts the MOVE operation which was interrupted by the power being turned off. FIG. 5 is a flowchart showing a restart operation in a case where, in this way, the power is turned off by an unexpected accident or the like, and thereafter, the power of the transmitting side device 100 is turned on.

At this time of restart, a MOVE restart instructing section 158 transmits a MOVE restart command to the receiving side device via the command processing section 155 (S201). Due to this MOVE restart command, the receiving side device enters a state in which data input is possible. Namely, the receiving side device rotates, for example, a hard disk of the HDD, and seeks the desired track by a recording head, and waits for data input.

In the transmitting side device 100, the position stored by the EOB next data position storing section 106 is outputted to a reproduction position retrieving section 107 (S202). Next, it is determined whether or not a data transmission request has been received from the receiving side (it is determined whether the receiving side device is in a state in which recording is possible) (S203). If the receiving side device can record, the recording/reproducing control section 108 restarts reproduction of the HDD 104 from the data, which should be transmitted to the receiving side device after the data to which the EOB is added (i.e., restarts reproduction from the data next to the data which was last transmitted in the MOVE operation before the power was turned off) (S204). The data for which reproduction is restarted is transmitted to the receiving side device via the output processing section 113.

The receiving side device, after receiving the MOVE restart command, records the data from the transmitting side from the next recording position next to the data which was already recorded. In accordance therewith, the receiving side device can record the content without a break due to the power having been turned off.

Figure 6:
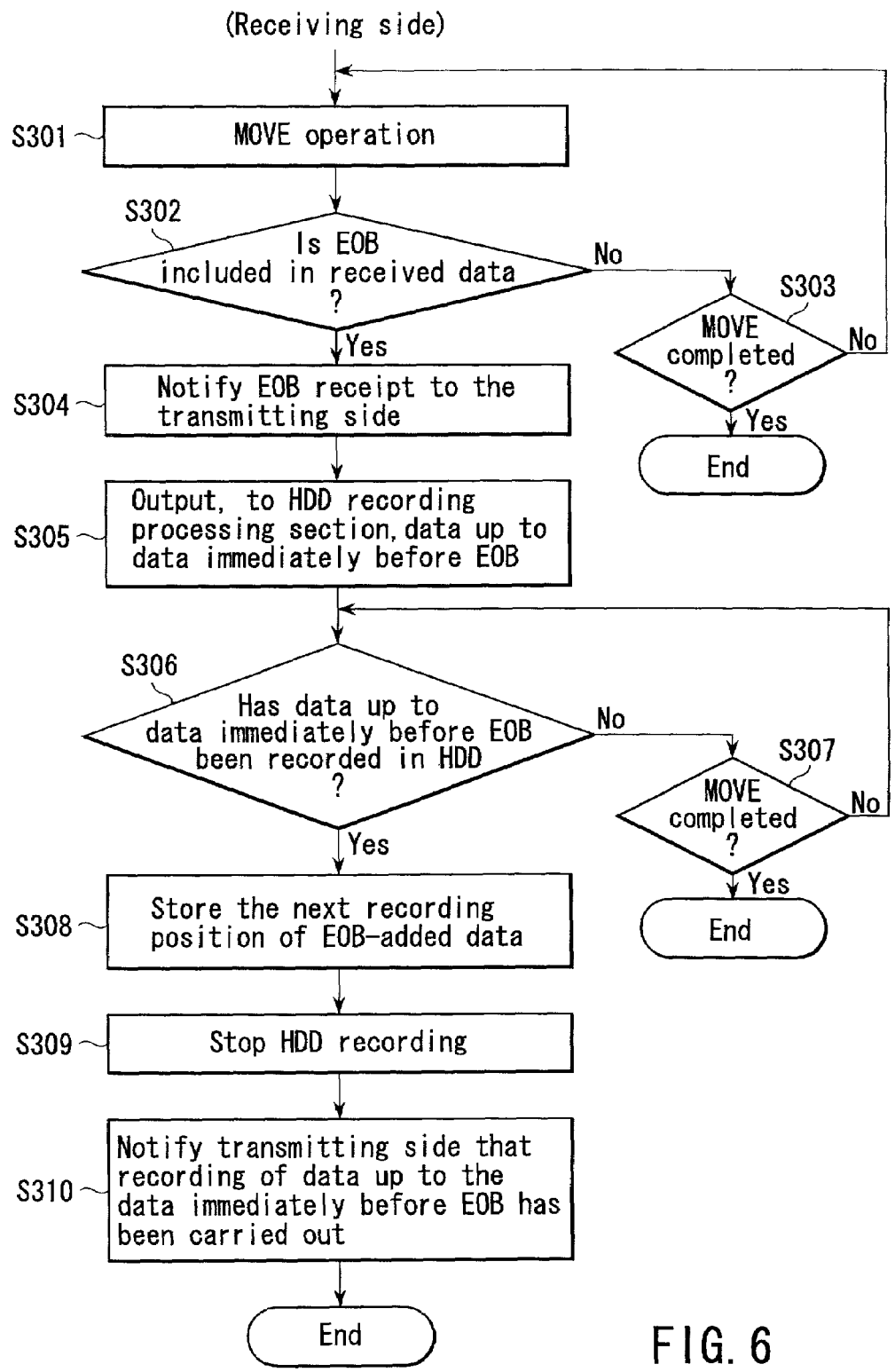
FIG. 6 is a flowchart showing operation of the receiving side device in a case where the power of the transmitting side device is operated to be off during MOVE operation.

FIG. 6 is, as mentioned above, a flowchart showing operation of the receiving side device in a case where the power of the transmitting side device is operated to be off during the MOVE operation. An EOB detecting section 203 of the receiving side device 200 shown in FIG. 2 detects the EOB in the data received at an input processing section 201 via an interface 160 (S302). When the EOB is detected, an EOB receipt notifying section 209 notifies the transmitting side device that the EOB has been detected (S304).

A recording stream processing section 202 records, into an HDD 207, the data up to the data which was received immediately before the EOB (S305) (the EOB itself is not recorded). When the recording of the data up to the data which was received immediately before the EOB is completed (in the case of YES in step S306), an EOB-added data position storing section 204 records the next recording position of the data to which the EOB is added (the data which was recorded last) (S308). A recording/reproducing control section 206 stops operation of the HDD 207 (S309), and the completion of the recording of the data up to the data which was received immediately before the EOB, is notified to the transmitting side via a command processing section 210 (S310).

Figure 7:
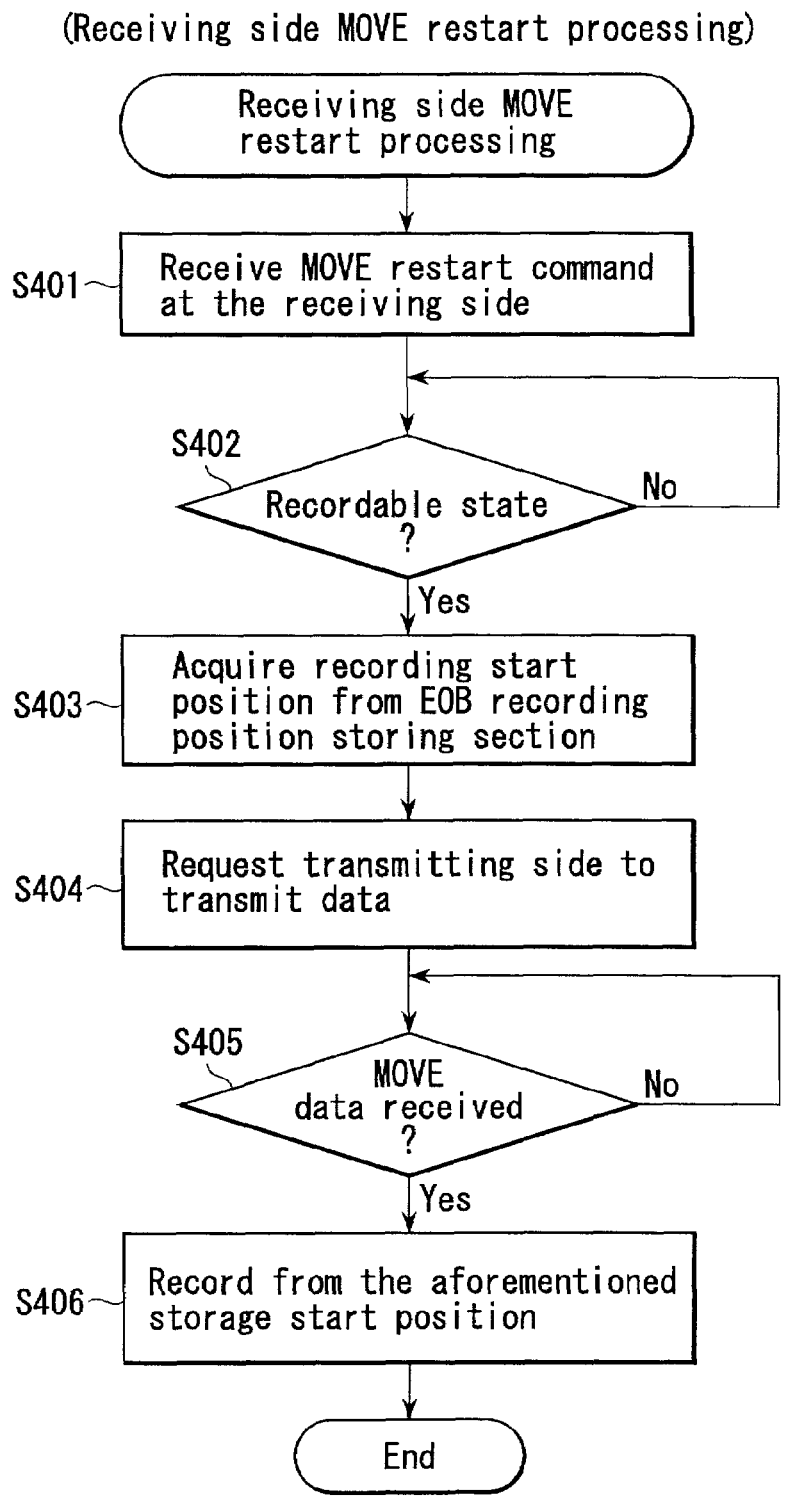
FIG. 7 is a flowchart showing restart operation of the receiving side device in a case where, after the power of the transmitting side device is turned off during MOVE operation, the power is turned on again.

FIG. 7 is a flowchart showing a restart operation of the receiving side device 200 in a case where the power of the transmitting side device is turned off during the MOVE operation, and thereafter, is turned on again.

When a MOVE restart command is received by the command processing section 210 (S401), the receiving side device 200 rotates, for example, the hard disk of the HDD, and the device is set in a state in which recording is possible. When the receiving side device 200 is in a state in which recording is possible (in the case of YES in step S402), a recording starting position retrieving section 205 acquires the data recording position immediately before the EOB from the EOB-added data position storing section 204 (S403). A MOVE restart instructing section 254 transmits a data transmission command to the transmitting side device 100 via the command processing section 210 (S404).

When the MOVE data is received at the input processing section 201 from the transmitting side device 100 (in the case of YES in step S405), the recording/reproducing control section 206 restarts recording of the received data, from the start position inputted from the recording starting position retrieving section 205 (S406). As a result, the content is recorded in the HDD 207 without a break due to the power being turned off. At the time of reproducing the content, a reproduction stream processing section 208 processes the signal reproduced from the HDD 207.

Figure 8:
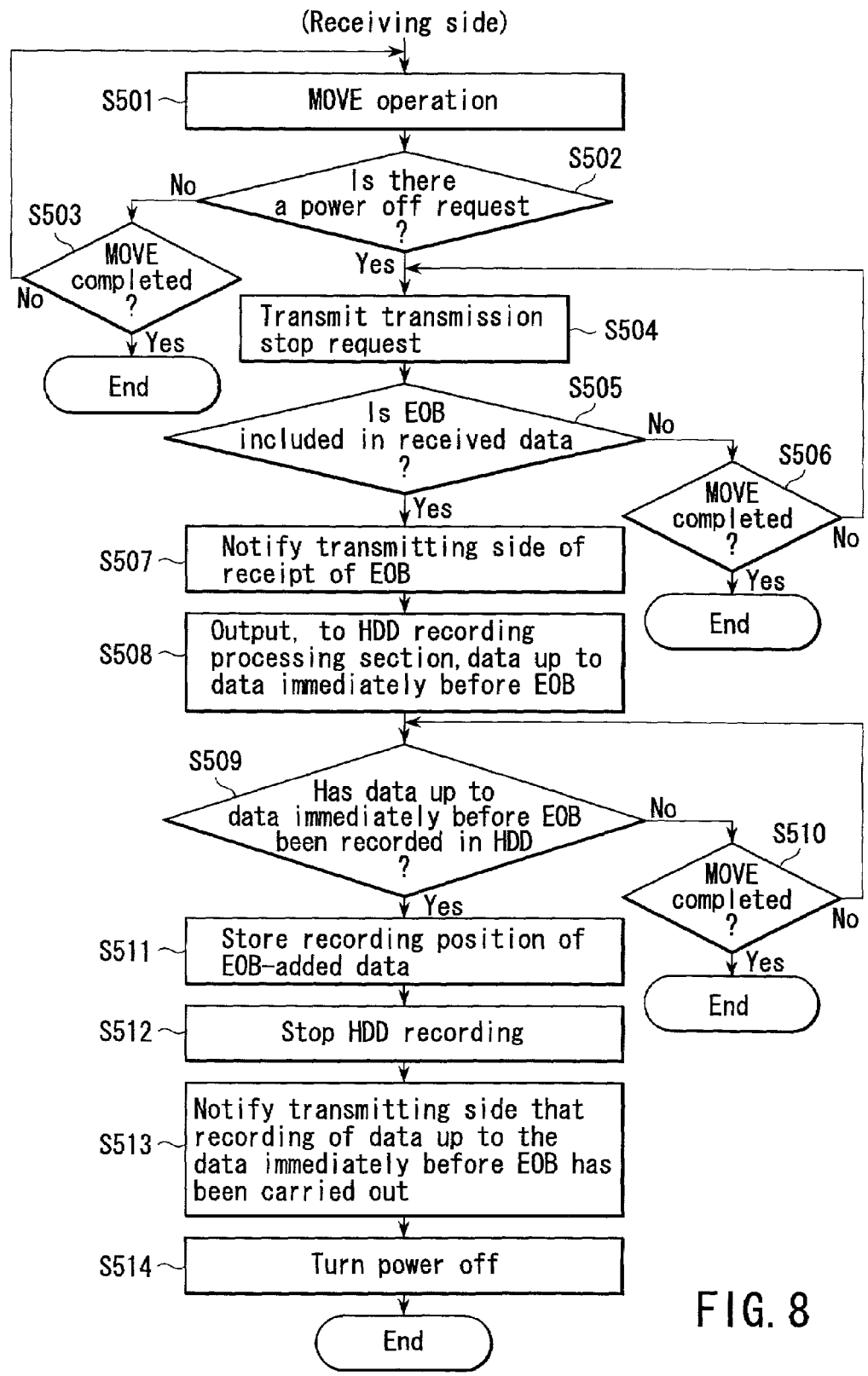
FIG. 8 is a flowchart showing operation of the receiving side device in a case where the power of the receiving side device is turned off during MOVE operation.

The above describes a case where the power at the transmitting side device is turned off during MOVE operation. Next, a case where the power of the receiving side device is turned off during MOVE operation, when the transmitting side device and the receiving side device have separate power sources (are separate devices), will be described. FIG. 8 is a flowchart showing operation of the receiving side device 200 in such a case.

A power on/off detecting section 251 detects a power off request due to a power switch 255 of the receiving side device being turned off or due to receipt of a power off command from a network (not shown) (S502). When there is a power off request, the power on/off detecting section 251 notifies this request to a power on/off control section 252.

When the power on/off control section 252 receives a power off request via the power on/off detecting section 251, the power on/off control section 252 controls a transmission stop requesting section 253 to generate a transmission stop command. The transmission stop requesting section 253 generates a transmission stop command, and the transmission stop command is transmitted to the transmitting side device by the command processing section 210 (S504).

In the transmitting side device 100 shown in FIG. 1, a transmission stop command receiving section 157 receives the transmission stop command via the command processing section 155. The EOB adding section 111 adds the EOB to the end of the transmitted data, and transmits the data to the receiving side device 200.

The receiving side device 200 shown in FIG. 2 receives the data including the EOB signal from the transmitting side device 100, and executes the processings of steps S505 through S513 in FIG. 8. These steps are similar to steps S302 through S310 in FIG. 6. After step S513, the power on/off control section 252 turns the power of the receiving side device off (S514).

Operations in a case where the power of the receiving side device 200 is turned on again by the user after the power has been turned off are similar to steps S401 through S406 in FIG. 7.

(Second Embodiment)

As another embodiment, a system is provided which continues MOVE operation until a certain break point of the content (for example, the end of a program), when a power off request arises during MOVE operation. The MOVE operation may be continued, for example, up to a break point of a program after a power off switch has been pushed, or up to a time which is set by the user, or until the user pushes a remote control switch for ending or interrupting the MOVE. In this way, when the MOVE operation is completed, in the same way as in the first embodiment, the EOB is added at the transmitting side, and the data is transmitted, and for example, the recording position of the data which was transmitted last is recorded in the transmitting and receiving side devices.

(Third Embodiment)

Next, an embodiment in which the EOB is added in a way different than that in the above-described embodiments will be described.

If an EOB is added after a power off request is given, it is impossible to correspond to cases of power failure or cases where a power source cord plug is pulled out from an outlet. In order to handle such cases, EOBs are added at intervals of a given number of packets of the transmission data, and the data are erased at each given packet interval. Further, the stored position of the data (packet) to which the EOB is added is recorded in the HDDs of the transmitting and receiving side devices or the like.

When the power is turned on, the transmitting side device 100 erases the data until the stored position of the data to which the last EOB was added (data which has been transmitted already). Further, the transmitting side device 100 restarts reproduction from the data next to the stored position of the data to which the EOB was added. In accordance with such MOVE operation, even if power is suddenly not supplied, the continuity of content data recorded in the receiving side device can be maintained.

Note that, in the respective embodiments of the present invention, if it can be known to what point the last data extends, it is not absolutely necessary to insert the EOB at the end of the last packet, and the EOB may be inserted in the header of the last packet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reproducing device which carries out MOVE processing of an AV (audio/video) file including audio/video data having a restriction on copying, the reproducing device comprising:

a transmitting section which divides one AV file recorded in a recording medium into AV data of a predetermined size which is smaller than the one file and transmits the data to a receiving device;

an erasing section which erases the transmitted AV data of the AV file from the recording medium when the transmitting section transmits the AV file to the receiving device, to prevent the AV file from existing both in the recording medium and the receiving device;

an ending flag adding section which adds an ending flag to the AV data to be transmitted from the transmitting section, when a power off signal for turning off a power is detected before a completion of the data transmission of the AV file by the transmitting section;

a reproduction restart information storing section which prepares information for restarting reproduction on the basis of a recording position, on the recording medium, of the data to which the ending flag is added, and which stores the information into a storing portion;

a power off section which turns off a power of the device, after the transmitting section transmits to the receiving device the AV data up to the data to which the ending flag is added and the erasing section erases the transmitted data from the recording medium, and the reproduction restart information storing section stores the information into the storing portion; and a restarting section which, after the power is turned on, makes the transmitting section restart reproduction and transmission of the AV data recorded in the recording medium, on the basis of the information for restarting the reproduction stored in the reproduction restart information storing section.

2. A reproducing device which carries out MOVE processing of an AV (audio/video) file including audio/video data having a restriction on copying, the reproducing device comprising:

a transmitting section which divides one AV file recorded in a recording medium into AV data of a predetermined size which is smaller than the one AV file and transmits the AV data to a receiving device;

an erasing section which erases the outputted AV data of the AV file from the recording medium, when the transmitting section transmits the data of the predetermined size to the receiving device, to prevent the AV file from existing in both the recording medium and the receiving device;

an interrupt signal adding section which adds an interrupt signal to the AV data transmitted from the transmitting section, when a power off signal for turning off a power is detected before the transmitting section completes transmission of data of the AV file;

a reproduction restart information storing section which prepares information for restarting reproduction on the basis of a recording position, on the recording medium, of data to which the interrupt signal is added, and which stores the information into a storing portion;

a power off section which turns off a power of the device, after the transmitting section transmits to the receiving device, the AV data up to the data to which the interrupt signal is added, the erasing section erases the transmitted data from the recording medium, and the reproduction restart information storing section stores reproduction restart information into the storing portion; and a restarting section which, after the power is turned on, causes the transmitting section to restart reproduction and transmission of the AV data recorded in the recording medium, on the basis of the information for restarting the reproduction, stored in the reproduction restart information storing section.

3. A reproducing device according to claim 1, further comprising a restart instructing section which, when the transmitting section restarts transmission of the file to the receiving device, transmits a restarting instruction such that the receiving device is set in a state in which receiving is possible.

4. A reproducing device according to claim 1, wherein the erasing section erases an address of the outputted data recorded in a management region of the recording medium.

5. A reproducing device according to claim 1, wherein the erasing section erases an encryption key for deciphering a cipher of the outputted data recorded in the recording medium.

6. A reproducing device according to claim 1, wherein the ending flag adding section adds the ending flag to the transmission data after a predetermined period of time when the power off signal is inputted while the transmitting section transmits the data recorded in the recording medium.

7. A reproducing device according to claim 1, wherein the reproduction restart information storing section stores the recording position of the data, recorded on the recording medium, next to the data to which the ending flag is added.

8. A reproducing device according to claim 1, further comprising a receiving device which receives and records a reproduction signal transmitted from the reproducing device, including:
  a recording section which records, on a second recording medium, the data transmitted from the reproducing device;
  a control section which makes the recording section record the data up to the data received immediately before the ending flag, when the data to which the ending flag is added is received from the reproducing device; and
  a recording position storing section which stores a recording end position of the data recorded in the recording section.

9. A reproducing device according to claim 8, wherein the control section records, on the second recording medium and from the position next to the recording end position, the data transmitted from the reproducing device at a time of restarting recording.

10. A reproducing device according to claim 8, wherein the receiving device further comprises a notifying section which notifies the reproducing device that the ending flag is received, when the data to which the ending flag is added is received from the reproducing device.

11. A reproducing device according to claim 8, wherein the receiving device further comprises a notifying section which notifies the reproducing device that the data up to the data to which the ending flag is added, is recorded on the second recording medium.

12. A receiving device comprising:
  a receiving section which receives one AV file from a reproducing device, wherein the AV file includes audio/video data having a restriction copying, and has been divided into a predetermined size which is smaller than the one AV file;
  a recording section which records, on a recording medium the AV data received by the receiving section;
  a stopping request transmitting section which transmits a transmission stopping request to the reproducing device when a power off signal for turning a power of the receiving device off is detected before the receiving section completes reception of data of the AV file;
  a control section which makes the recording section record on the recording medium the data up to the data received immediately before a ending flag, when the data to which the ending flag is added for ending recording is received at the receiving section from the reproducing device in response to the ending flag;
  a recording position storing section which stores a recording end position of the AV data recorded in the recording section;
  a power off section which turns the power off after the AM data up to the data to which the ending flag is added is recorded by the control section, and after a recording end position is recorded by the recording position storing section; and
  a restarting section which, after the power ins turned on, restarts reception and recording of data of the AV file, on the basis of the recording end position stored in the recording position storing section.

13. A data reproducing method for a reproducing device which carries out MOVE processing of an AV (audio/video) file including audio/video data having a restriction on copying, the reproducing device comprising:
  dividing one AV file recorded in the recording medium into AV data of a predetermined size which is smaller than the one AV file and transmitting the AV data to the receiving device;
  erasing transmitted AV data of the AV file from the recording medium, when the AV file is transmitted to the receiving device, to prevent the AV file from existing in both the recording medium and the receiving device;
  adding an ending flag to the AV data transmitted to the receiving, when a power off signal for turning power off is input before transmission of data of the AV file is complete;
  preparing reproduction restart information for restarting reproduction, on the basis of a recording position on the recording medium of the data to which the ending flag is added, and storing the information in a storing section;
  turning off a power of the device, after the AV data up to the data to which the ending flag is added is transmitted to the receiving device, the transmitted data is erased from the recording medium, and the reproduction restart information is stored in the storing section; and
  restarting reproduction and transmission of the AV data recorded in the recording medium after the power is turned on, on the basis of the reproduction restart information stored in the storing section.

14. A method according to claim 13, wherein the ending flag adding comprises detecting a power off signal for turning off a power of the receiving device from the receiving device.

15. A method according to claim 13, further comprising transmitting a restarting instruction such that the receiving device is set in a state in which receiving is possible, when the transmission of the file to the receiving device is restarted by the transmitting.

16. A method according to claim 13, wherein the erasing comprises erasing an address of the transmitted data recorded in a management region of the recording medium.

17. A method according to claim 13, wherein the erasing comprises erasing an encryption key for deciphering a cipher of the transmitted data recorded in the recording medium.

18. A method according to claim 13, wherein the flag adding comprises adding the ending flag to the transmission data after a predetermined period of time when the power off signal is inputted while the data recorded in the recording medium is transmitted by the transmitting.

19. A method according to claim 13, wherein the restart information storing comprises storing the recording position of the data, recorded on the recording medium, next to the data to which the ending flag is added.

* * * * *